Patented July 14, 1942

2,289,898

UNITED STATES PATENT OFFICE 2,289,898

SULPHONATED HYDROXYDIARYL - ALDEHYDE - HYDROCARBON CONDENSATION PRODUCT

Helmut Böhler, Radebeul, Germany, assignor to Chemische Fabrik von Heyden Aktiengesellschaft, Radebeul, near Dresden, Germany, a corporation of Germany No Drawing. Application April 28, 1939, Serial No. 270,509. In Germany May 3, 1938

6 Claims. (Cl. 260—49)

This invention relates to the art of water-soluble condensation products, and involves improvements in the product itself as well as in the manufacture and use thereof. Broadly considered the improved condensation product is produced by condensing a hydroxydiaryl sulphonic acid with an aldehyde in the presence of an aromatic hydrocarbon.

The product possesses many important properties, and is capable of use for many purposes. The product possesses the property of precipitating proteins from the solution, and therefore is suitable for use as a tanning agent for the production of very full, soft, light colored leather. It is also suitable for use in the textile industry as a resistant and as a mordant for basic dyes. It possesses insecticidal properties, and may be used to impregnate textiles to render them moth and vermin proof.

The new product may be used either in the form of a free acid os as a salt of the acid, and this makes it possible to vary the hydrogen ion concentration in accordance with the conditions of use.

Merely as one example the product may be made as follows:

170 parts of ortho oxydiphenyl, otherwise known as ortho phenylphenol are sulphonated by heating with 120 parts of 96% sulphuric acid. The resultant sulphonic acid is diluted with 30 parts of water, and 60 parts of finely pulverized naphthalene are added with vigorous agitation. Following this, 100 parts of 38% formaldehyde are gradually added with continued stirring. The condensation is effected by cautious warming, and is complete when a sample yields a clear solution upon dilution with water. The batch is next diluted with 300 parts of water and neutralized with caustic soda solution. The acid solution possesses outstanding tanning power, and produces a full-feeling, soft and light colored leather.

Instead of using phenylphenol, various other hydroxydiaryls may be used, such for instance as hydroxyditolyls, hydroxydinaphthyls, naphthyl phenols and their substitution products. Instead of using formaldehyde, various other aldehydes may be used, or I may use methylal, methylenechloride, etc.

Instead of using naphthalene, various other hydrocarbons of aromatic nature may be used, for instance mononuclear or poly-nuclear hydrocarbons such as anthracene, their homologues, and substitution products, such as chlornaphthalene.

The relative properties of the parts will vary depending upon what particular alternative compounds are used in the preparation of the product.

Having thus described my invention, what I claim as new and desire to secure by Letters Patent is:

1. The process of preparing a water-soluble condensation product, which includes warming a sulphonic acid of ortho phenylphenol with an aldehyde, in the presence of naphthalene.

2. The process of preparing a water-soluble condensation product, which includes warming a sulphonic acid of ortho phenylphenol with a sulphonic acid of ortho phenylphenol with formaldehyde in the presence of naphthalene.

3. A water-soluble condensation product resulting from the warming of a sulphonic acid of phenylphenol with formaldehyde in the presence of naphthalene.

4. The process of preparing a water-soluble condensation product, which includes warming a sulphonic acid of a hydroxydiaryl with an aldehyde in the presence of naphthalene, said hydroxydiaryl being of the type having two benzene rings directly connected together and a hydroxyl group directly attached to one ring.

5. The process of preparing a water-soluble condensation product, which includes warming a sulphonic acid of orthophenylphenol with an aldehyde in the presence of an aromatic hydrocarbon and selected from the group consisting of naphthalene and anthracene.

6. The process of preparing a water-soluble condensation product, which includes warming a sulphonic acid of a hydroxydiaryl with an aldehyde in the presence of an aromatic hydrocarbon selected from the group consisting of naphthalene and anthracene, said hydroxydiaryl being of the type having two benzene rings directly connected together and a hydroxyl group directly attached to one ring.

HELMUT BÖHLER.